(12) United States Patent
Durfee

(10) Patent No.: US 7,083,166 B1
(45) Date of Patent: Aug. 1, 2006

(54) LIGHT-WEIGHT, MODULAR WORK-HOLDING CHASSIS

(76) Inventor: David L. Durfee, 14527 Rt. 98, Meadville, PA (US) 16335

( * ) Notice: Subject to any disclaimer, the term of this patent is extended or adjusted under 35 U.S.C. 154(b) by 0 days.

(21) Appl. No.: 10/957,397

(22) Filed: Oct. 1, 2004

Related U.S. Application Data

(60) Provisional application No. 60/508,025, filed on Oct. 1, 2003.

(51) Int. Cl.
*B23Q 3/08* (2006.01)

(52) U.S. Cl. ........................................................ 269/32

(58) Field of Classification Search ................ 269/32, 269/900, 27, 289 R, 309, 24; 312/290
See application file for complete search history.

(56) References Cited

U.S. PATENT DOCUMENTS

| 4,828,240 | A | * | 5/1989 | Longenecker et al. ........ 269/47 |
| 5,788,225 | A | * | 8/1998 | Iwata et al. .................. 269/309 |
| 5,820,118 | A | * | 10/1998 | Craft ............................ 269/24 |
| 6,299,151 | B1 | * | 10/2001 | Smith ........................... 269/32 |
| 6,578,938 | B1 | * | 6/2003 | Norman et al. ............. 312/290 |
| 6,877,729 | B1 | * | 4/2005 | Lin et al. ...................... 269/25 |

* cited by examiner

*Primary Examiner*—Lee D. Wilson
(74) *Attorney, Agent, or Firm*—Richard K. Thomson

(57) ABSTRACT

A work-holding chassis is constructed of at least one lower manifold/bracket and at least one upper manifold/bracket with fixture plates attached thereto. An optional center manifold/bracket can be included for additional strength. This chassis is light-weight since the center is essentially hollow. In addition, the modular construction allows the components to be reconfigured and reused for sequential applications. The manifold/brackets have any of a number of differing geometric shapes to which the fixture plates may be attached. The manifold/brackets and fixture plates may be customized to have internal plumbing to afford fluid pressure to activate hydraulic clamps, components, etc.

16 Claims, 12 Drawing Sheets

LIGHT-WEIGHT, MODULAR
WORK-HOLDING CHASSIS

This application claims benefit of Provisional patent application Ser. No. 60/508,025 filed Oct. 1, 2003.

BACKGROUND AND SUMMARY OF THE INVENTION

The present invention is in the field of the machining of parts. More particularly, the present invention is directed to a light-weight, modular work-holding chassis, or "tombstone", for mounting work pieces so that they may be machined. Applicant hereby claims priority of provisional patent appl. No. 60/508,025 filed Oct. 1, 2003.

The use of work-holding chassis for mounting work pieces which are carried from station to station in a) a horizontal machining center or b) a vertical machining center with an indexer or, c) in a transfer line, for performing various machining operations thereon is known in the industry. Indeed, the use of work-holding chassis is widely preferred due to the part density which can be achieved by fixturing parts to all sides of the chassis. Work-holding chassis permit the machining of parts from many directions, particularly if the chassis can be indexed (i.e., in a horizontal machining center or a vertical machining center with an indexer). The shape of the chassis is dictated by a number of factors: 1) the size of the workpiece, 2) the size of the machine, and 3) tool clearance issues within the machine. The more sides available, the more parts which can be fixtured at any one time.

While some work-holding chassis have manually operable clamping, health issues have helped drive the industry toward the use of hydraulic clamping. Elimination of manually operable clamping reduces incidents of worker fatigue and carpel tunnel syndrome. Hydraulic clamping is also preferred due to its consistency and ability to produce higher clamping pressures.

The existing work-holding chassis typically are bulky blocks of steel mounted on a heavy base plate by which the chassis and its cargo of parts is moved from station to station. In some instances, these lines are fully automated with the various operations being programmed into the computer controller. The principal problem with these prior art chassis is their bulk. A secondary problem is their lack of versatility. The bulkiness takes its toll on the equipment being utilized in moving these chassis. In addition, the workmen have to manually index the chassis to load and unload them. This can result in muscle, tendon, and ligament strain in the repetitive moving of the chassis, day in and day out. The lack of versatility adds to the per part cost of manufacture. Since a chassis is constructed for the finishing of a particular type of part, once that part has run its course, the tombstone becomes scrap material. In some instances, the lack of versatility of the work-holding chassis results in its being scrapped for simply a design change in the part or a change in the machining required. A further drawback of existing tombstones is the use of external hydraulic lines. These lines are external to the periphery of the chassis and, are thereby, restrictive to tool-to-the-workpiece approach and are subject to damage which leads to significant down time.

The light-weight, modular work-holding chassis of the present invention overcomes these shortcomings. The work-holding chassis is comprised of at least one lower manifold/bracket having a first geometric shape; at least one upper manifold/bracket having a second identical geometric shape spaced from the lower manifold/bracket by a first distance and defining a first volume, the upper and lower manifold/brackets occupying significantly less than an entirety of the first volume; a plurality of fixture plates attachable to the upper and lower manifold/brackets; means to attach at least one workpiece to the fixture plates. A central manifold/bracket may optionally be positioned intermediate the lower and the upper manifold/brackets to reinforce the plurality of fixture plates. The number of the plurality of fixture plates is preferably equal to the number of a plurality of faces positioned on an external periphery of the first and second geometric shapes.

The means to attach at least one workpiece to the fixture plates includes a plurality of any of various types of clamps for engaging the at least one workpiece. In one application, swing clamps are used with the clamps being hydraulically operated. At least one, and preferably both, of the lower and the upper manifold/brackets contains internal feed lines for hydraulic fluid. In one embodiment, the hydraulic feed lines are completely internal to the manifold/bracket and the fixture plates. Alternatively, each end of these internal feed lines may be equipped with a threaded aperture for receiving couplings from flexible hoses for carrying hydraulic fluid, the flexible hoses being confined within said first volume, i.e., within the boundary of the tombstone.

In another aspect of the invention, a kit for constructing fixtures for mounting workpieces for machining is provided, the kit comprising a first plurality of manifold/brackets having an external periphery with a first geometric shape and a first plurality of sides; a second plurality of manifold/brackets having an external periphery with a second different geometric shape with a second different plurality of sides; a third plurality of fixture plates attachable to both the first plurality of sides and to the second plurality of sides; whereby a workpiece fixture can be formulated with the optimum configuration for a particular application by assembling at least some of the third plurality of fixture plates to one of a group selected from the first plurality of manifold/brackets and the second plurality of manifold/brackets.

Various other features, advantages and characteristics of the present invention will become apparent to one of ordinary skill in the art after a reading of the following specification.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF PREFERRED EMBODIMENT(S)

Figure 1:
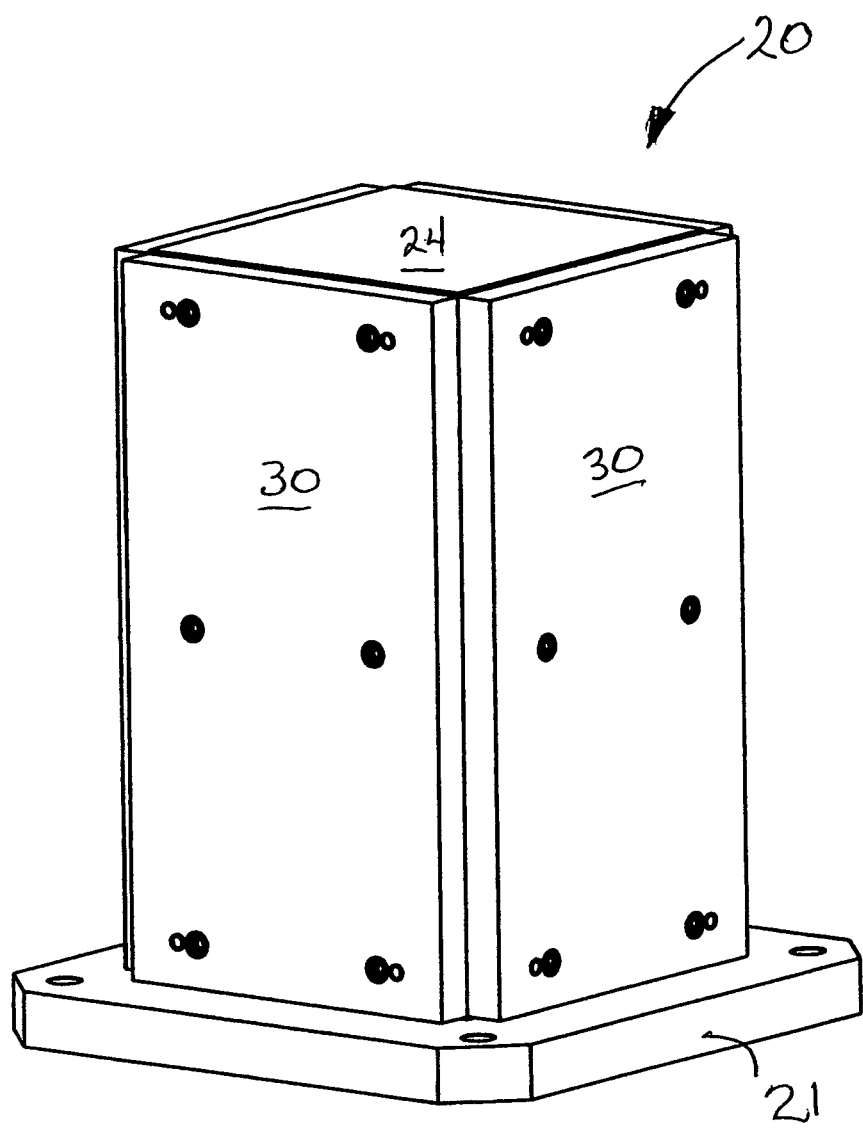
FIG. 1 is a front perspective view of a first embodiment of the light weight, modular work-holding chassis of the present invention.
Figure 2:
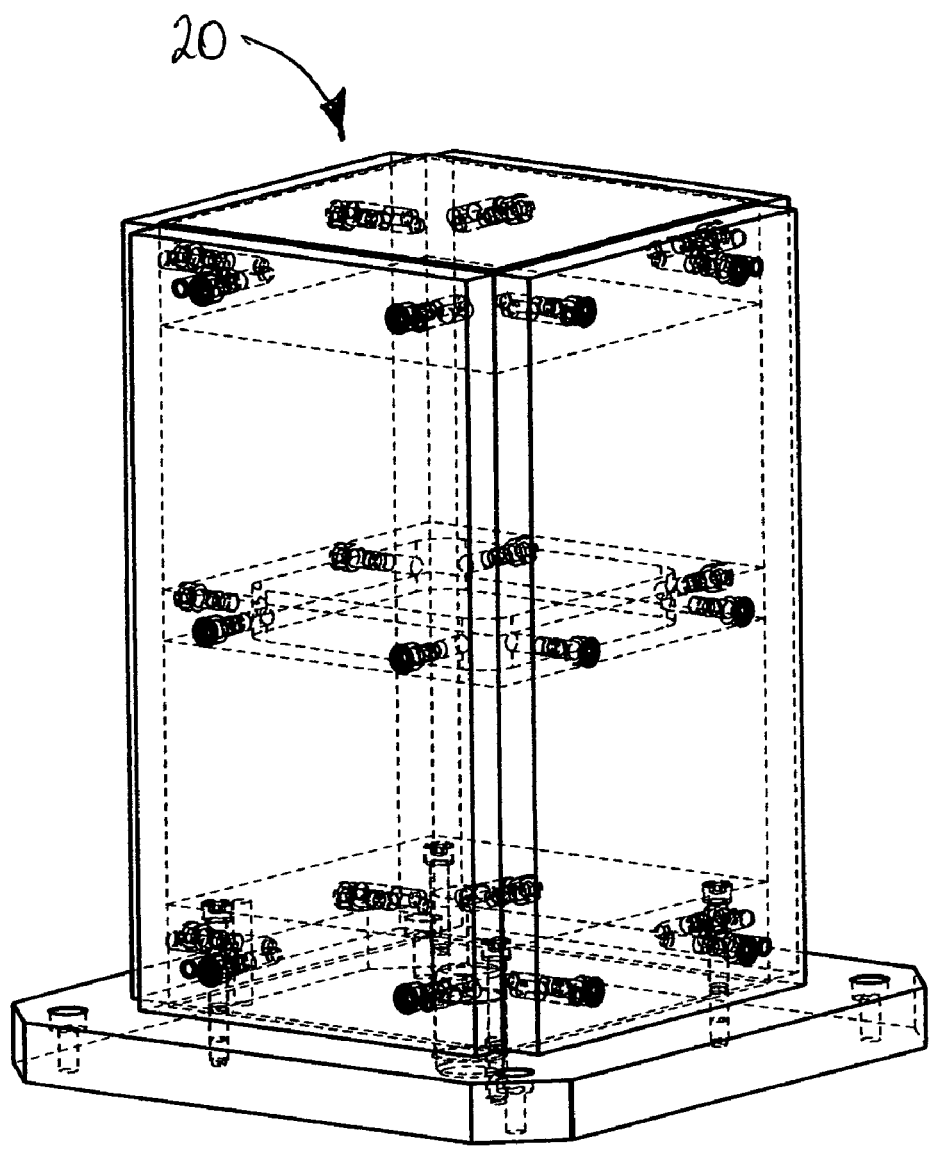
FIG. 2 is a front perspective view with hidden items shown in dotted line.
Figure 3:
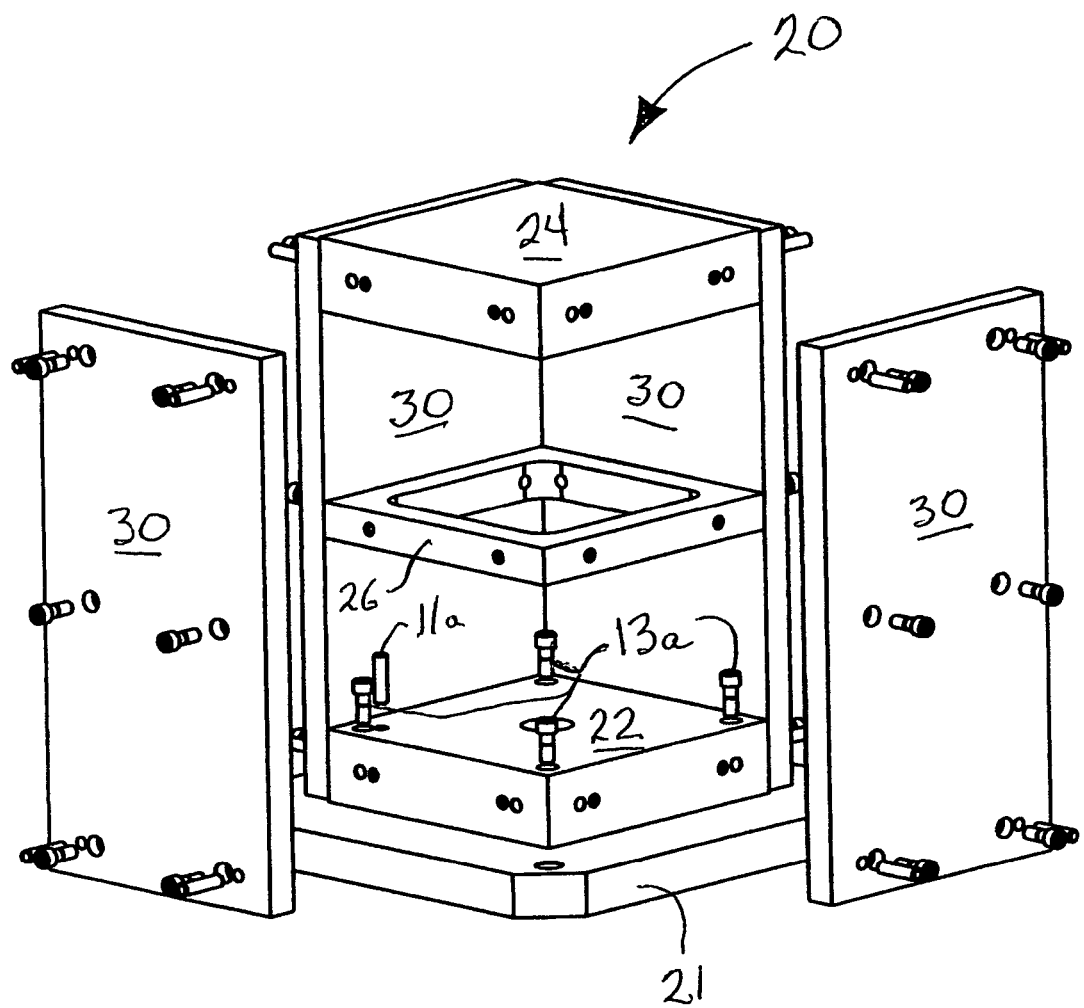
FIG. 3 is a is a front perspective view with parts removed to show added detail.
Figure 4:
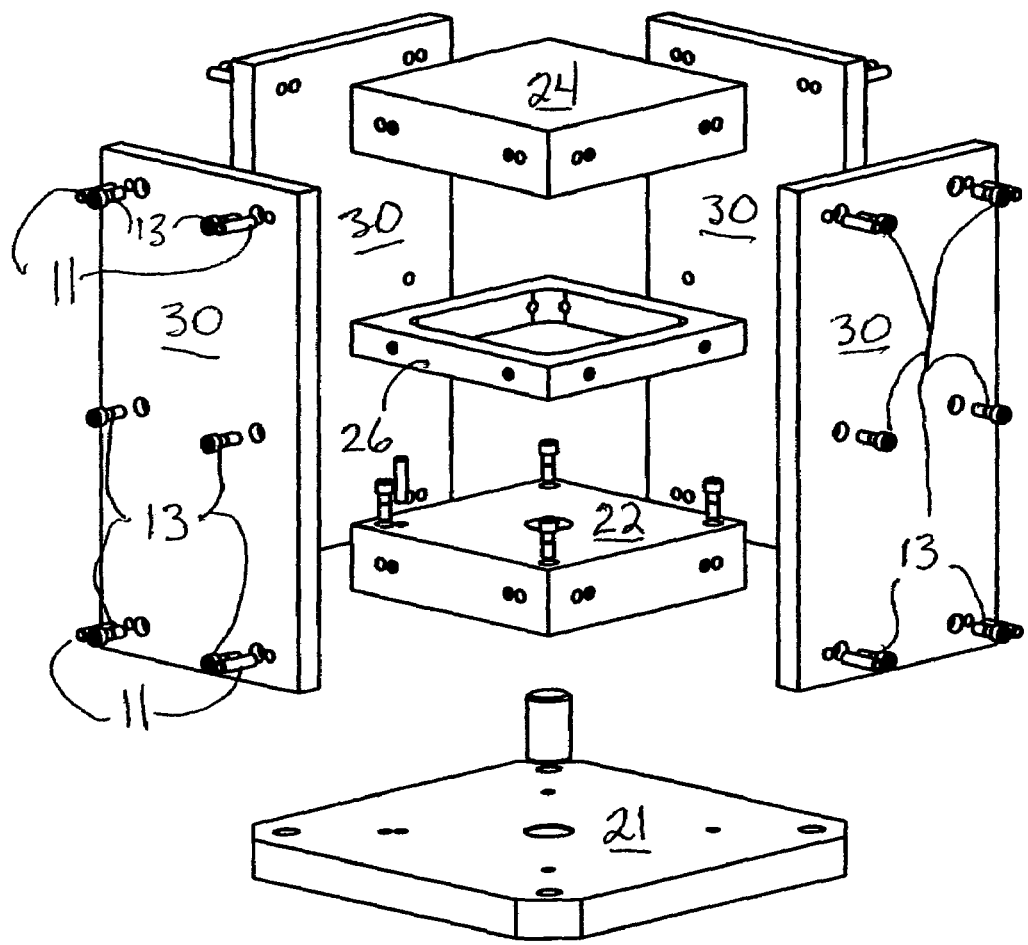
FIG. 4 is an exploded front perspective view.

A first embodiment of the light-weight, modular work-holding chassis of the present invention is shown in FIGS. 1–4, 5A and 5B, generally at 20. Chassis 20 comprises at least one lower manifold/bracket 22 (FIG. 3) and at least one upper manifold/bracket 24. The details of these lower and upper manifold/brackets 22, 24 will be discussed hereinafter. The lower manifold/bracket 22 may optionally be mounted on a base 21 using dowel pins 11a and bolts 13a. Traditional tombstones use such bases to provide support and stability. The light-weight, modular work-holding chassis 20 of the present invention does not need such extra bulk to provide it stability but may be used with a base 21 if operational considerations require it. By eliminating base 21, there is additional weight savings, as well as obtaining several inches additional clearance within the machining center. These inches could be used to construct a taller tower 20 which may provide additional space for processing more workpieces or, if the additional length is not needed, simply improve operational clearances during machining.

A plurality of fixture plates 30 each having identical dimensions are attached to lower and upper manifold/brackets 22, 24 using alignment dowel pins 11 and bolts 13. It will be appreciated that any form of attachment means (including spot welding) could be used to assemble the plates 30 to the manifold/brackets 22, 24 without departing from the scope of the invention. A central manifold/bracket 26 can optionally be provided to stabilize fixture plates 30 (depending on their length). Central manifold/bracket 26 may be cored out in the middle. This has the dual benefit of reducing weight and providing clearance for internal hoses, plumbing, etc., should the application warrant it. The chassis 20 as depicted herein can be customized to accommodate manual or hydraulic fixation of workpieces to the external surfaces thereof.

Figure 5A:
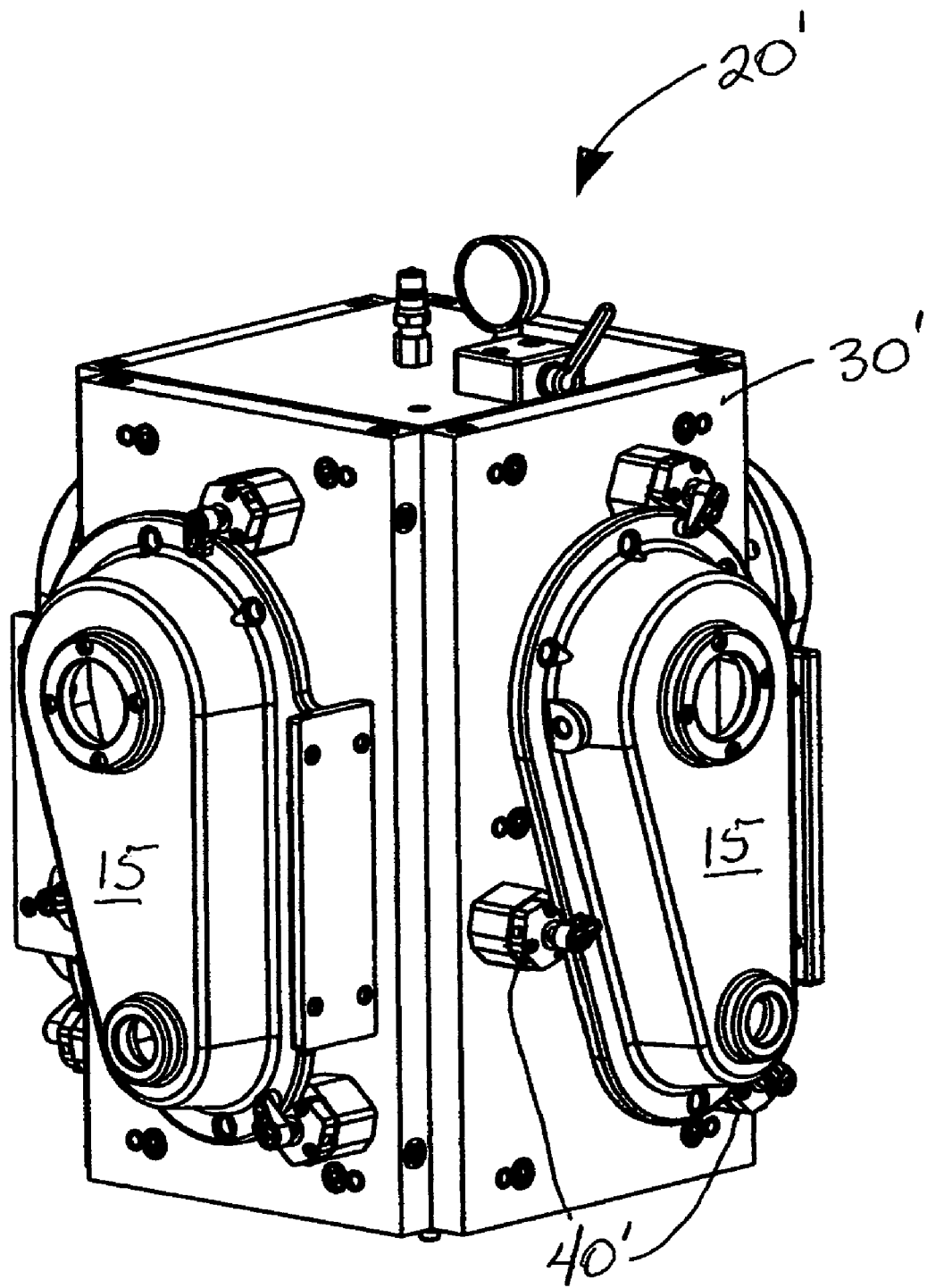
FIG. 5A is a front perspective view of a second embodiment customized for workpieces, shown in this view only without the optional base.
Figure 5B:
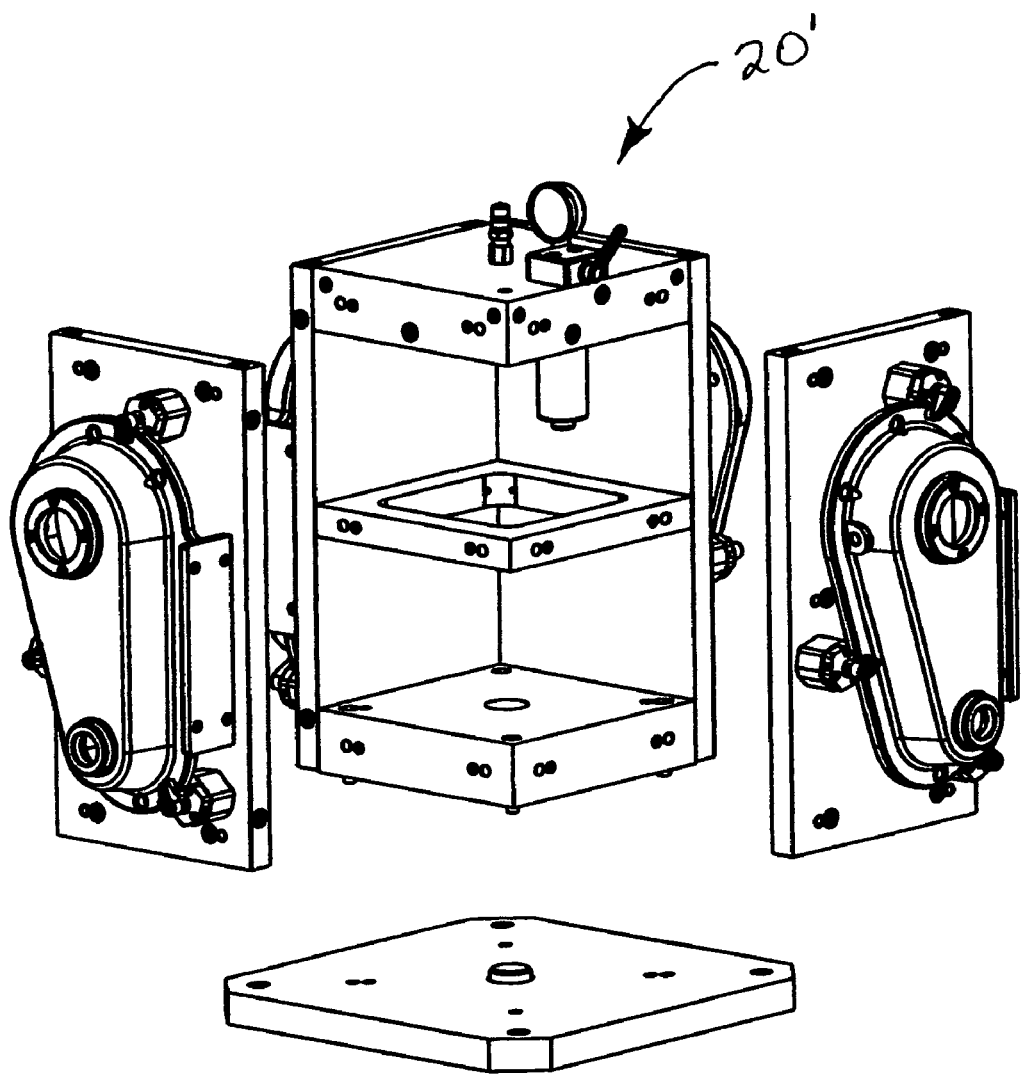
FIG. 5B is an exploded front perspective view of the second embodiment with workpieces affixed thereto.
Figure 5C:
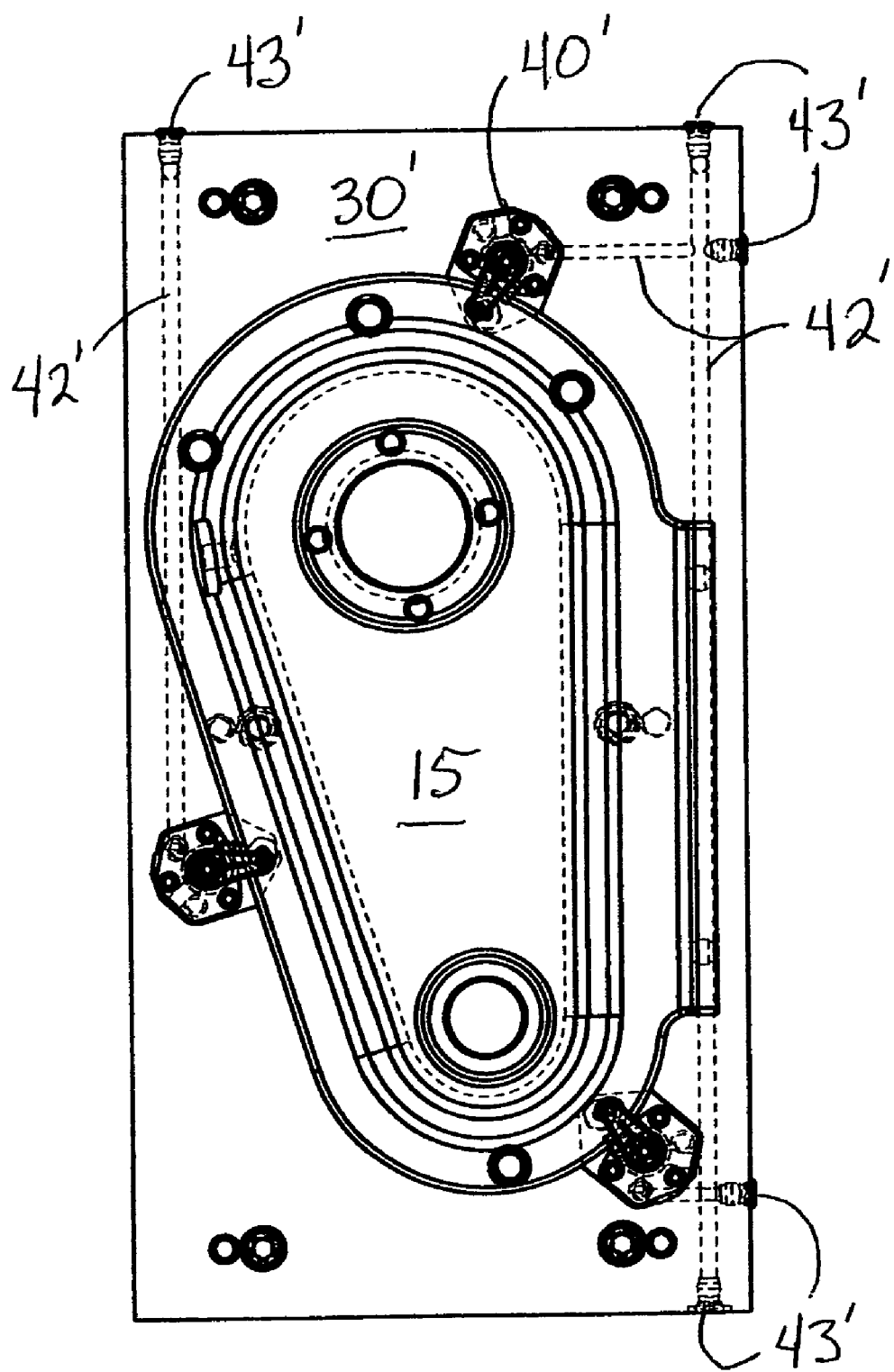
FIG. 5C is a front view of one fixture plate with parts affixed thereto.

FIGS. 5A–5B depict a second embodiment of the light-weight, modular work-holding chassis of the present invention, generally at 20'. This chassis 20' has been customized for a particular application utilizing hydraulic clamping. Chassis 20' is equipped with a plurality (three being shown, although lesser or more could be used) of hydraulic clamps 40' outfitted on each fixture plate 30'. As can be seen in FIG. 5C, fixture plates 30' have been modified with internal hydraulic lines 42' including branch lines to carry fluid to the clamps 40' for their engagement and disengagement with workpieces 15. Plugs 43 are inserted in the ends of the lines 42' after machining to provide a closed hydraulic system.

Figure 5D:
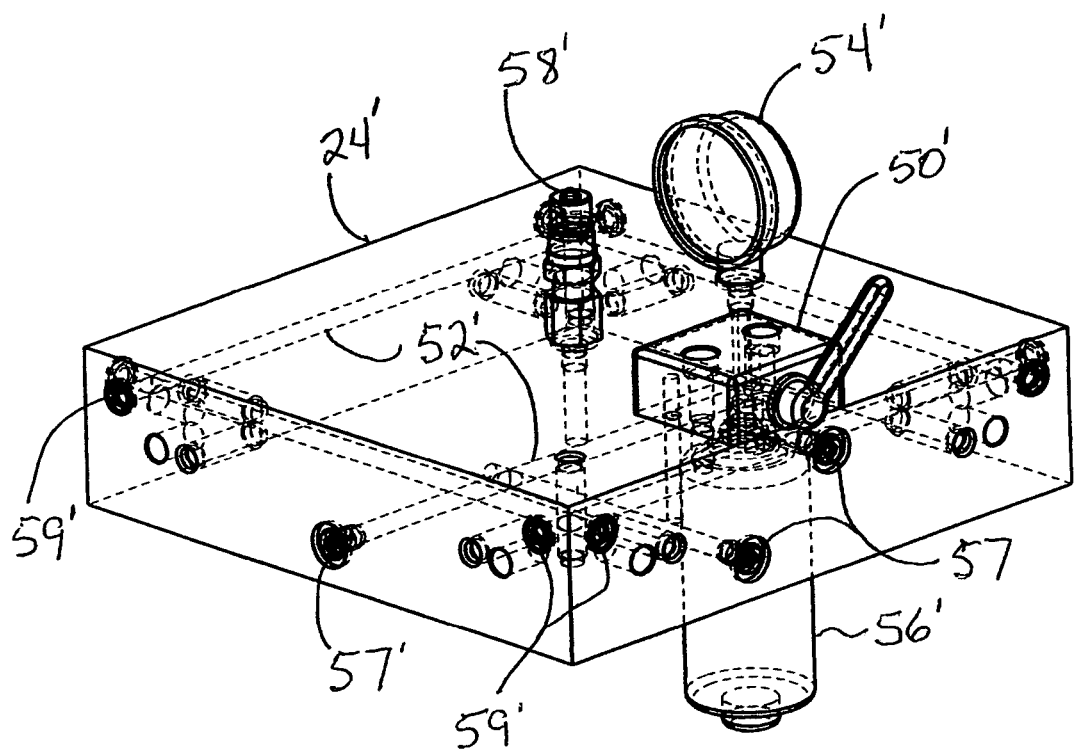
FIG. 5D is a detailed front perspective view of a manifold/bracket of the second embodiment.

The details of the customized manifold/bracket 24' is shown in FIG. 5D. A valve assembly 50' outfitted with a pressure gauge 54' is mounted on the upper surface of upper manifold/bracket 24'. A hydraulic accumulator 56' is provided for the system beneath manifold/bracket 24' and a hydraulic feed coupling 58' is provided for charging the system. Hydraulic feed lines 52' are machined into the manifold/bracket and those lines which are not needed for a particular application, plugged as at 57'. Those lines 52' which are selected for use in a particular application are equipped with sealing means such O-rings 59' which interface with apertures (not shown) on the interior faces of fixture plates 30' to supply hydraulic clamps 40'. Obviously, the internal hydraulic feed lines 52' can be customized to operate other peripheral devices in addition to clamps 40'.

Figure 6:
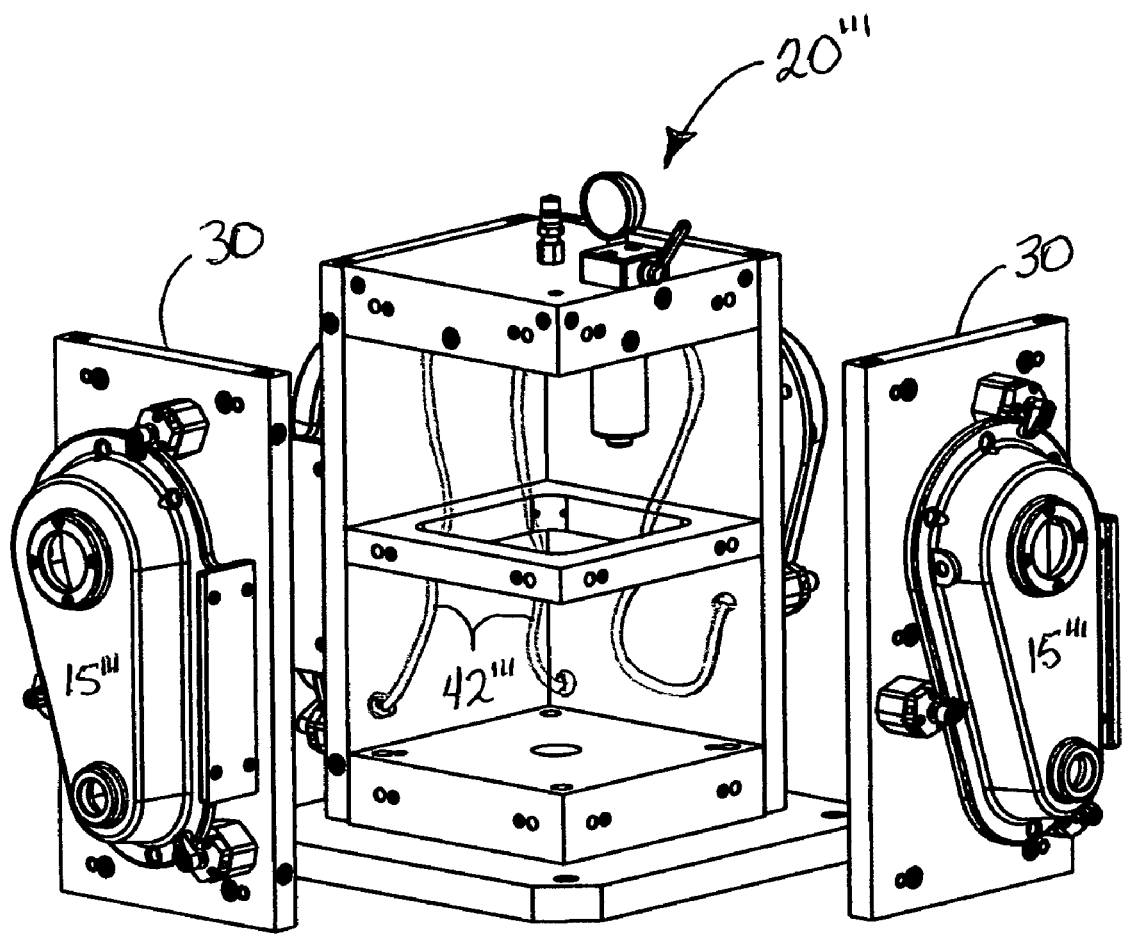
FIG. 6 is an exploded perspective view of a third embodiment with an alternate fluid distribution system.

A third embodiment as shown in FIG. 6, demonstrates the versatility of the light-weight, modular work-holding chassis 20''' which permits the use of flexible (or rigid) feed lines 42''' internal to the periphery of the chassis 20'''. This will provide improved accessibility by the machine tools to the workpieces 15''' which are mounted about the periphery of chassis 20'''. These flexible feed lines 42''' are, also, thereby protected from damage and getting hung up on things, conditions to which they are exposed when mounted exteriorly of the chassis 20'''.

Figure 7A:
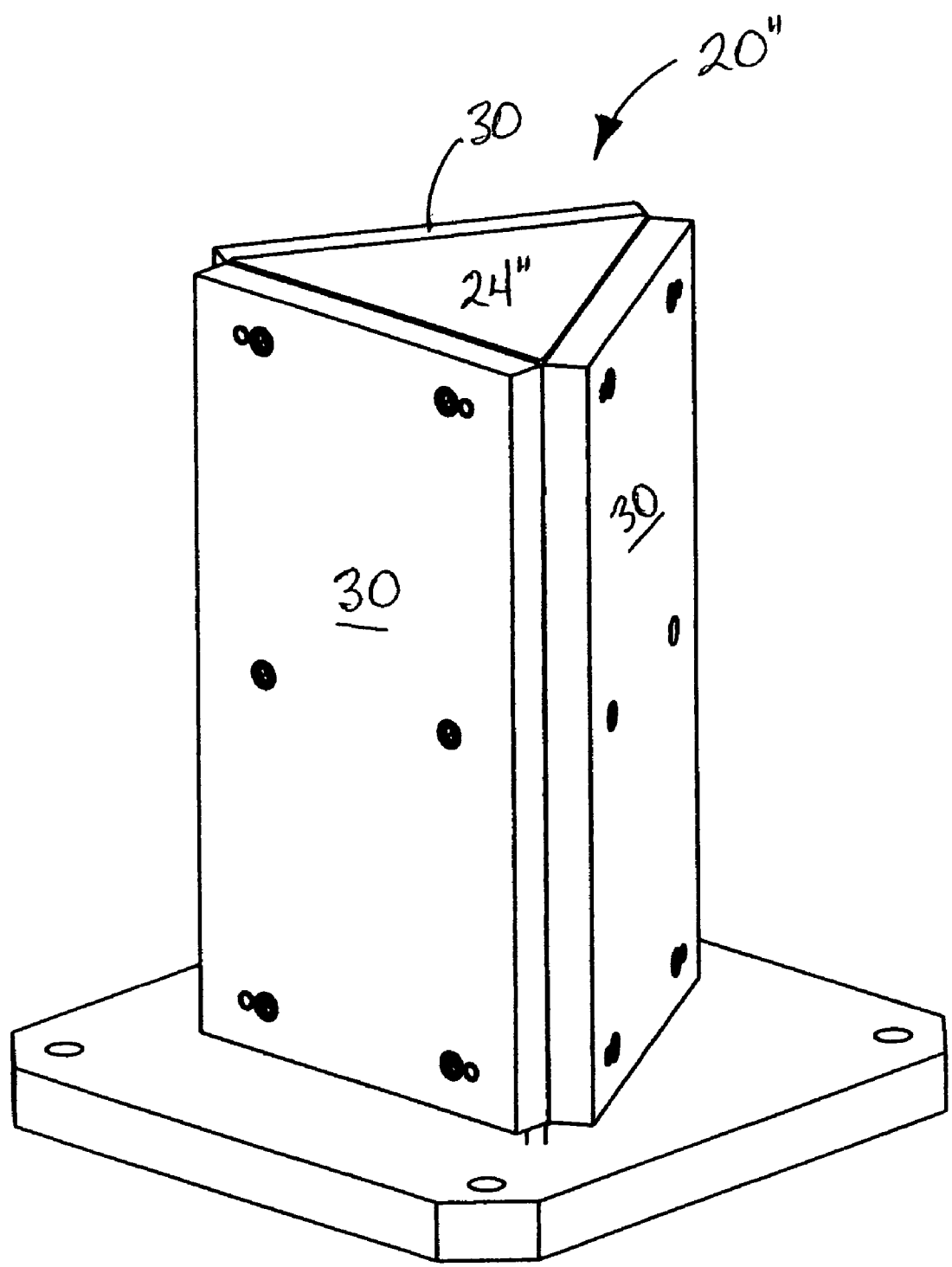
FIG. 7A is a front perspective view of a second configuration of the light weight modular work-holding chassis which is included in the kit.
Figure 7B:
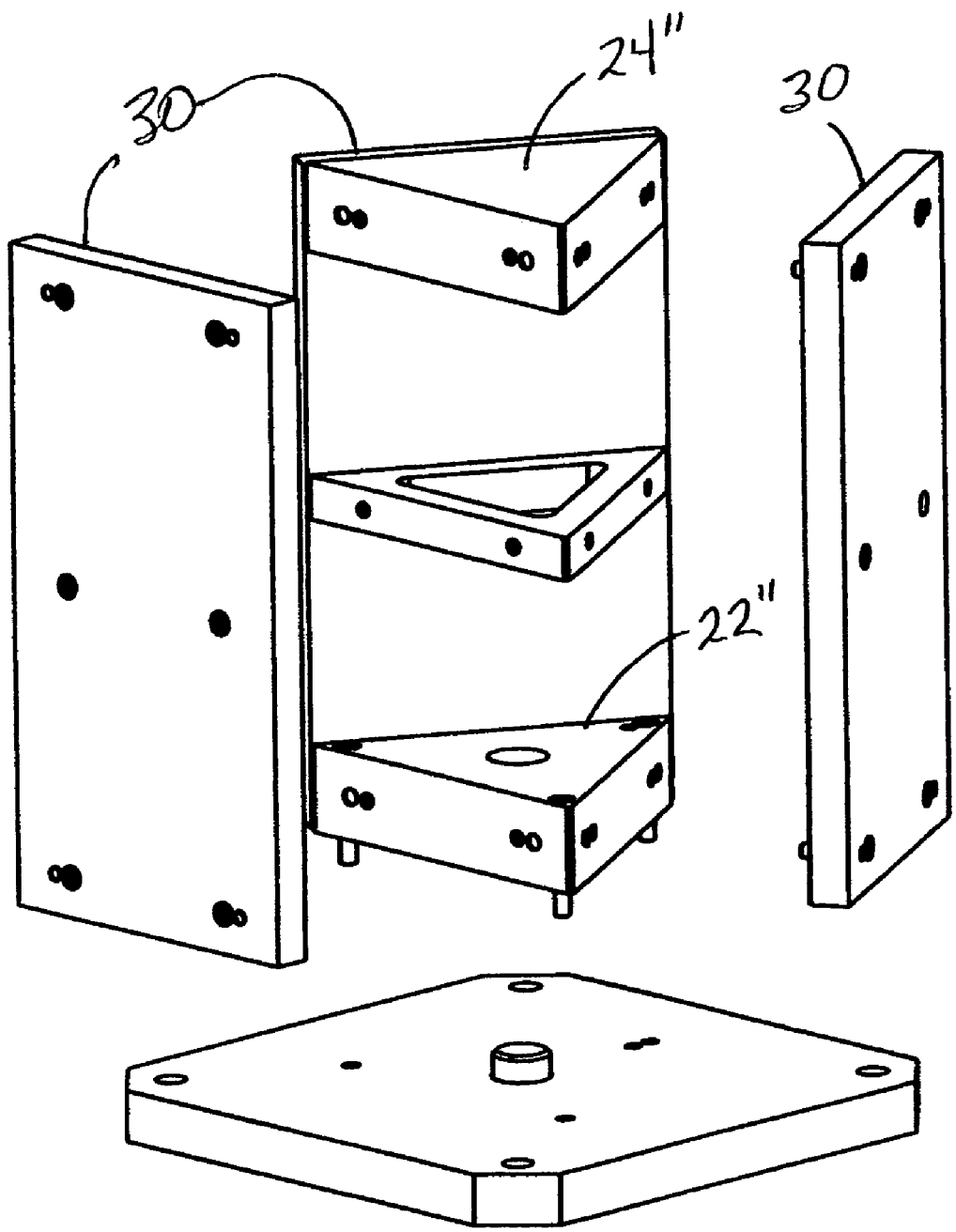
FIG. 7B is an exploded front perspective view of the second configuration.

FIGS. 7A–7B depict a second configuration of light-weight, modular work-holding chassis generally at 20". It is envisioned that a variety of component parts will be sold as a kit. This kit would include a plurality of manifold/brackets 22, 24 with a first geometric configuration (by way of example, square) and a second plurality of manifold/brackets 22", 24" with a second geometric configuration (by way of example, triangular). The fixture plates 30 used in this configuration are the same ones used previously to construct the square configuration depicted in FIGS. 1–4. Once the need for the square configuration has evaporated, the components may be disassembled and, rather than scrapped, re-configured for another application. Fixture plates 30, although depicted as having only one length, could certainly be provided in a plurality of lengths to construct chassis 20" having a plurality of heights. Obviously, other geometric shapes including pentagonal, hexagonal, and octagonal, could also be employed, depending on the size of the parts, the size of the machine processing the workpieces, and the clearances available/needed within the workspace.

Figure 8:
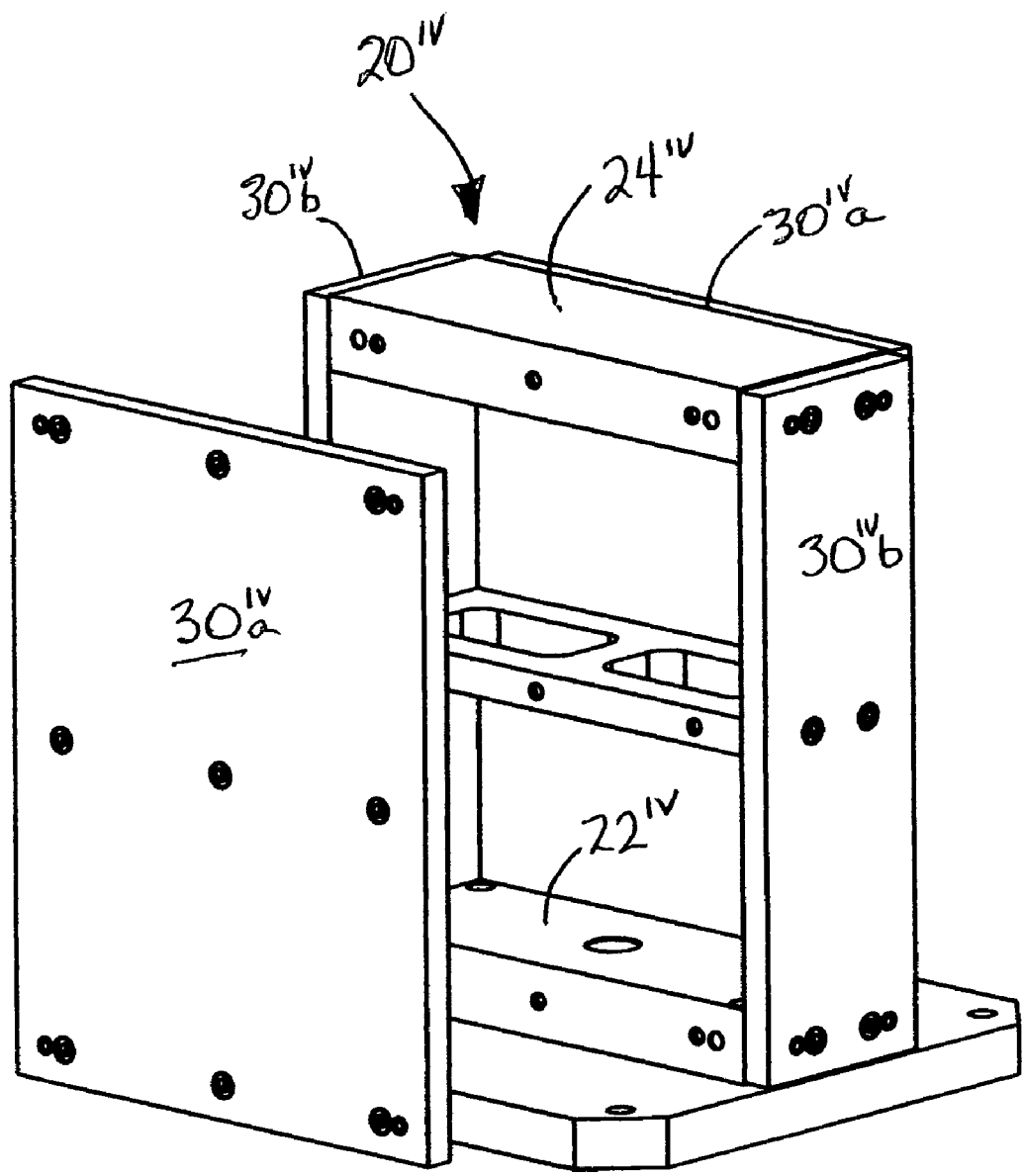
FIG. 8 is an exploded front perspective view of a fourth embodiment of the light weight modular work-holding chassis of the present invention.

Yet a fourth embodiment is shown in general at $20^{iv}$ in FIG. 8. To this point all fixture plates have been shown as being uniform in their dimensions. Obviously, if the specific application requires it, two groups of fixture plates $30^{iv}$a and $30^{iv}$b could be provided which have differing dimensions and the manifolds $22^{iv}$ and $24^{iv}$ could be rectangular or other non-equilateral configuration.

Various changes, alternatives and modifications will become apparent to one of ordinary skill in the art following a reading of the foregoing specification. It is intended that any such changes, alternatives and modifications as fall within the scope of the appended claims be considered part of the present invention.

I claim:

1. A light-weight, modular work-holding chassis for supporting work pieces comprising:
  a) at least one lower manifold/bracket having a first geometric shape, a first upper surface spaced from a first lower surface by a distance defining a first height;
  b) at least one upper manifold/bracket having a second identical geometric shape, a second upper surface spaced from a second lower surface by a distance defining a second height, said second lower surface being spaced from said first upper surface of said lower manifold/bracket by a first distance significantly greater than said first and second heights and defining a first volume, said upper and lower manifold/brackets occupying significantly less than an entirety of said first volume;

c) a plurality of fixture plates attachable to said upper and lower manifold/brackets and forming interconnecting structural support between said upper manifold/bracket and said lower manifold/bracket, said fixture plates constituting the only interconnecting support structure between said upper and lower manifold/brackets;

d) means to attach at least one workpiece to said fixture plates.

2. The light-weight modular work-holding chassis of claim 1 further comprising a central manifold/bracket positioned intermediate said lower and said upper manifold/brackets to reinforce said plurality of fixture plates.

3. The light-weight modular work-holding chassis of claim 1 wherein said plurality of fixture plates are equal to a plurality of faces positioned on an external periphery of said first and second geometric shapes.

4. The light-weight, modular work-holding chassis of claim 3 wherein at least some of said plurality of fixture plates have identical dimensions.

5. The light-weight, modular work-holding chassis of claim 4 wherein all of said plurality of fixture plates have identical dimensions.

6. The light-weight, modular work-holding chassis of claim 4 wherein said at least some of said plurality form a first group of said fixture plates and a second group of said fixture plates all have identical second dimensions.

7. The light-weight modular work-holding chassis of claim 1 wherein said means to attach at least one workpiece to said fixture plates comprises a plurality of swing clamps for engaging the at least one workpiece.

8. The light-weight modular work-holding chassis of claim 7 wherein said swing clamps are hydraulically operated.

9. The light-weight modular work-holding chassis of claim 8 wherein at least one of said lower and said upper manifold/brackets contains internal feed lines for hydraulic fluid.

10. The light-weight modular work-holding chassis of claim 9 wherein each of said lower and said upper manifold/brackets contains internal feed lines for hydraulic fluid.

11. The light-weight modular work-holding chassis of claim 9 wherein each of said fixture plates contains internal feed lines for hydraulic fluid.

12. The light-weight modular work-holding chassis of claim 9 further comprising threaded apertures at each end of said internal feed lines, said threaded apertures receiving couplings from flexible hoses for carrying hydraulic fluid, said flexible hoses being confined within said first volume.

13. A kit for constructing fixtures for mounting workpieces for machining, said kit comprising a) a first plurality of manifold/brackets having an external periphery with a first geometric shape, a first upper surface spaced from a first lower surface by a first distance defining a first height and a first plurality of sides;

b) a second plurality of manifold/brackets having an external periphery with a second different geometric shape, a second upper surface spaced from a second lower surface by a second distance defining a second height with a second different plurality of sides;

c) a third plurality of fixture plates attachable to both said first plurality of sides and to said second plurality of sides, said fixture plates forming interconnecting structural support between said upper manifold/bracket and said lower manifold/bracket, said fixture plates constituting the only interconnecting supporting structure between said upper and lower manifold/brackets;

whereby a workpiece fixture can be formulated with the optimum configuration for a particular application by assembling at least some of said third plurality of fixture plates to one of a group selected from said first plurality of manifold/brackets and said second plurality of manifold/brackets.

14. The kit of claim 13 wherein at least some of said third plurality of fixture plates have identical dimensions.

15. The kit of claim 13 wherein all of said third plurality of fixture plates have identical dimensions.

16. The kit of claim 13 wherein said at least some of said plurality form a first group of said fixture plates and a second group of said fixture plates all have identical second dimensions.

* * * * *